May 11, 1954 W. J. GOETZ 2,678,140
POWER SHOVEL
Filed Dec. 24, 1948 3 Sheets-Sheet 3
FIG_6
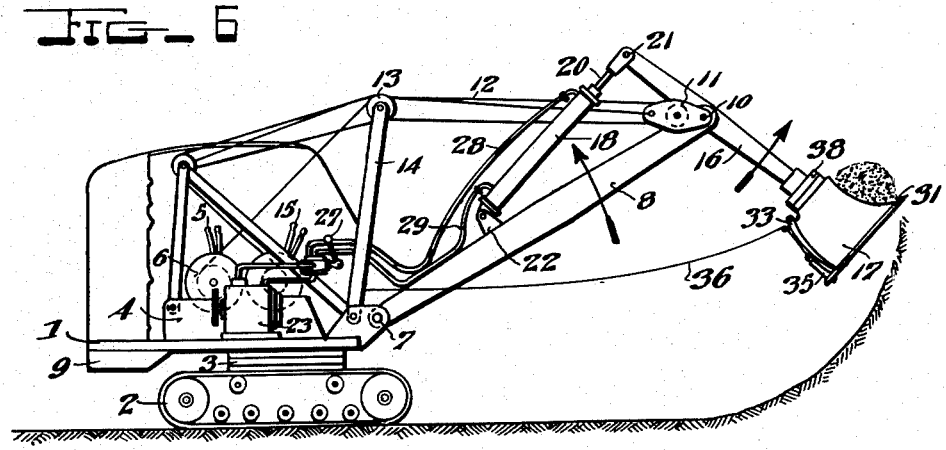
FIG_7
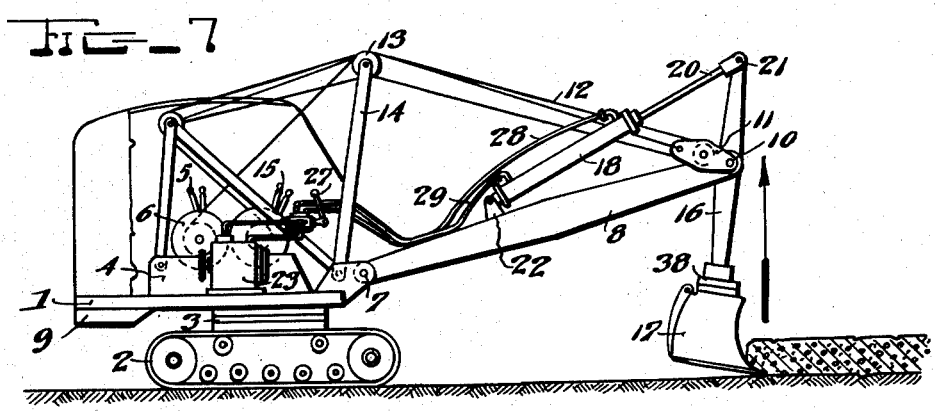
FIG_8   FIG_9
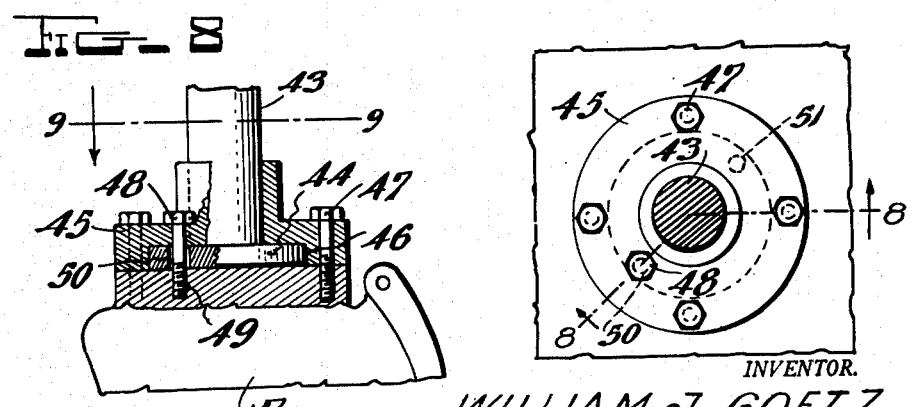
INVENTOR.
WILLIAM J. GOETZ,
BY
Beaman & Patch
ATTORNEYS Patented May 11, 1954

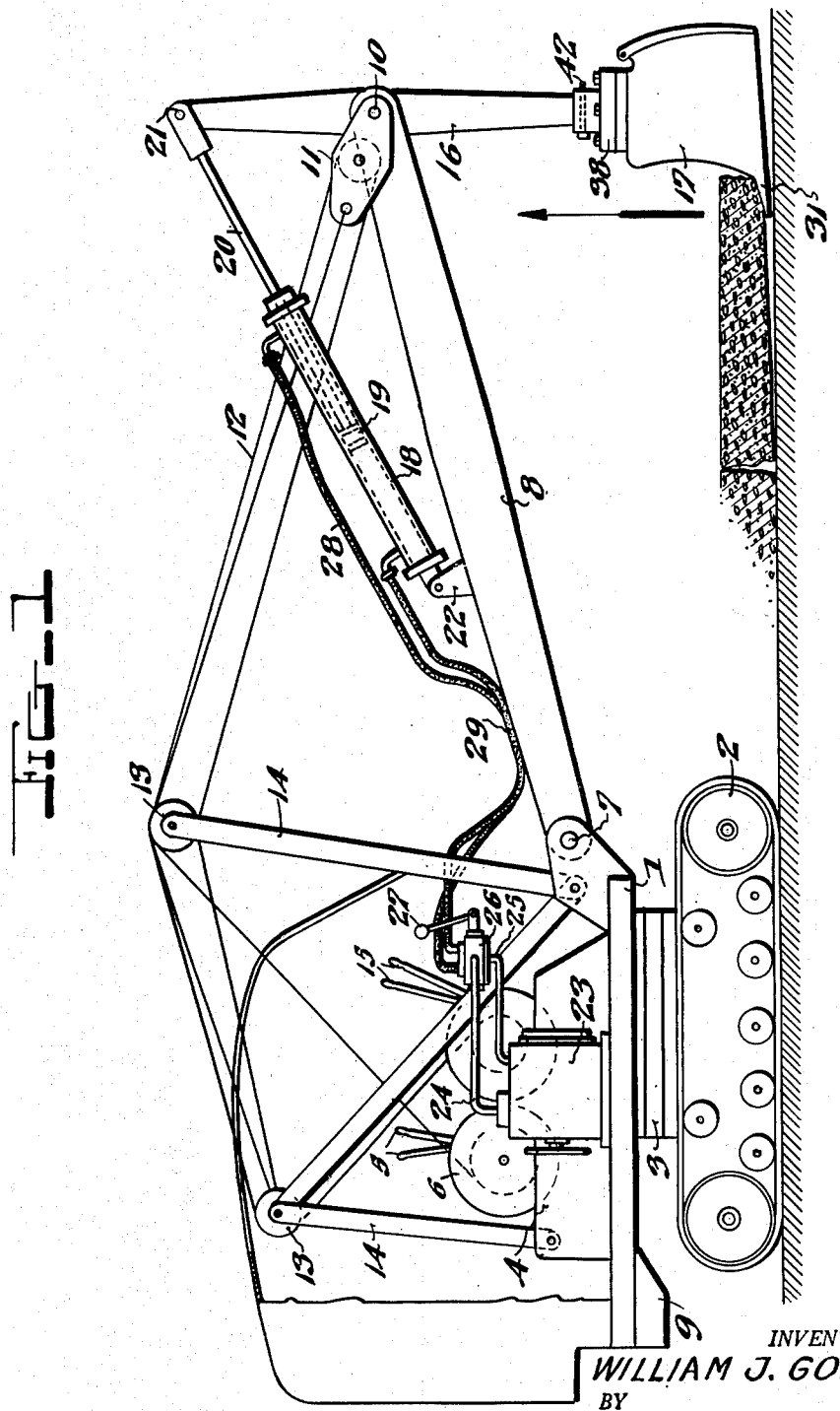

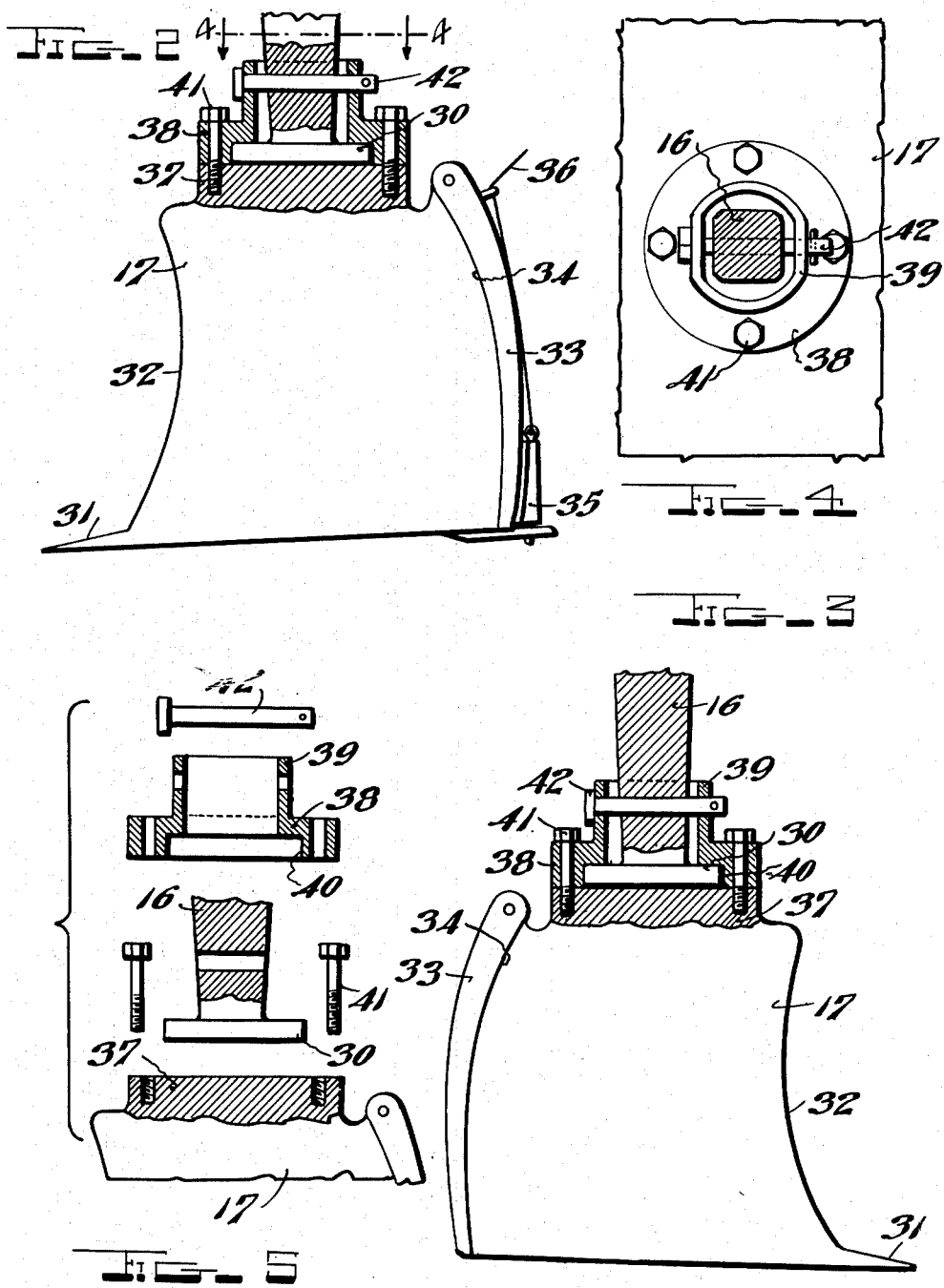

2,678,140

UNITED STATES PATENT OFFICE 2,678,140

POWER SHOVEL

William J. Goetz, Erie, Pa.

Application December 24, 1948, Serial No. 67,163

1 Claim. (Cl. 214—138)

My invention relates to improvements in power shovels, and particularly to shovels of the type in which a shovel bucket is carried and is actuated by a movable shovel handle.

An object is to provide a structure of this character in which the shovel bucket is carried by the shovel handle for reversible adjustment to accomplish disposition of the bucket in either of two operating positions for use either as a shovel or as a drag shovel.

Another object is to so construct and mount and associate the parts that the shovel bucket is substantially swiveled at one end of the shovel handle so that reversal can be readily and easily and quickly accomplished by releasing and then rotating the shovel bucket through substantially 180 degrees, without necessity for disassembly or lifting parts or other arduous or complicated work or operations.

Still another purpose is to provide readily operated means for positively locking and securing the shovel bucket in either of its adjusted operative positions, and for insuring against accidental or casual displacement when the shovel is in use.

A further object is to provide a power shovel having a swingably mounted shovel bucket carrying and operating shovel handle together with double acting fluid cylinder and piston means for swinging said shovel handle in desired operating movement and for locking said handle against movement.

Still another purpose is to provide a power shovel including a swingably mounted shovel handle with a shovel bucket reversibly carried at one end to be faced in one direction for use as a shovel and in the opposite direction for use as a drag shovel, and double acting fluid cylinder and piston means connected and cooperating with the other end of the shovel handle for swinging said shovel handle for working and return movement of the shovel bucket when in use in each and either of its adjusted positions.

Yet another object is to provide power shovel supporting structure having a boom swingably mounted at one end on the supporting structure, with a shovel handle swingably mounted in its middle portion on the other end of the boom so that one end of the handle is disposed upwardly and the other end is disposed downward, together with a shovel bucket carried in working position at the lower end of the handle, and fluid cylinder and piston means connected with the upper end of the handle and with the boom at a point spaced inwardly from the mounting of the handle thereon so that the shovel handle can be positively swung and operated in swinging movement in either direction.

A still further purpose is to provide a power shovel structure having a bucket carrying shovel handle swingably mounted with fluid cylinder and piston means connected with said shovel handle for swinging the same and operating the bucket, and fluid control means for said fluid cylinder and piston means.

Another object is to provide a power shovel of the type set forth including movable supporting structure having a boom swingably mounted at one of its ends with the other end swingable in a substantially vertical or perpendicular direction, together with a shovel handle swingably mounted in its middle portion on the swinging end of the boom so that one end of the handle is disposed upwardly and the other end is disposed downwardly and carries a shovel bucket, and fluid cylinder and piston means connected with the upper end of the handle and with the boom at a point spaced inwardly from the mounting of the handle thereon so that the shovel handle can be positively swung and operated in either direction and can be held substantially stationary, and with cable control means for lifting and lowering the boom.

A still further object is to provide a power shovel of the type described in which a shovel handle is swingably mounted in its middle portion, a shovel bucket is carried at the lower end of the swingable shovel handle and fluid cylinder and piston means is connected with the upper end of the handle, together with means to control fluid for movement of the handle in either direction and for supplying fluid to both sides to lock the shovel handle against swinging movement.

Still another purpose of my invention is to provide power shovel structure which can be simply and inexpensively manufactured, can be used and operated in substantially any and all places and for any and all purposes for which power shovels are now employed, which will present little likelihood of being damaged or broken in its parts when in use, and which can be adjusted and can be operated and handled more expeditiously and with greater facility than has heretofore been possible with power shovel structures as ordinarily constructed and operated.

With the above and other objects in view, some of which will be apparent to those skilled in the art, and others of which are inherent in the construction and operation and use of the parts, my invention includes certain novel features of construction and association of parts which will be hereinafter more fully set forth in connection with the drawings, and will then be pointed out in the claim.

In the drawings:

Figure 1 is a view in side elevation showing a power shovel embodying the construction and principle of my invention, and with the shovel bucket adjusted for use as a drag shovel.

Fig. 2 is an enlarged fragmentary view showing the shovel bucket and a portion of the shovel handle, and with parts in section to better illustrate the construction.

Fig. 3 is a view similar to Fig. 2 showing the shovel bucket reversed through substantially 180 degrees to face in the opposite direction for use as a positive or crowd or scoop shovel.

Fig. 4 is a fragmentary transverse sectional view taken substantially on line 4—4 of Fig. 2.

Fig. 5 is a fragmentary composite disassembled view, partly in section, showing the parts of the shovel bucket mounting aligned and arranged substantially in their manner of assembly.

Fig. 6 is a view in side elevation, on a reduced scale, somewhat similar to disclosure of Figure 1, and showing the bucket shovel adjusted and in operation as a positive or scoop shovel.

Fig. 7 is a view similar to Fig. 6 illustrating the use of a power shovel to accomplish substantially perpendicular lift, as in breaking up a slab, or floor or roadway.

Fig. 8 is a fragmentary detail, partly in section, substantially on the line 8—8 of Fig. 9, showing a modified embodiment of mounting for the reversible shovel bucket.

Fig. 9 is a fragmentary transverse sectional view substantially on line 9—9 of Fig. 8.

Many of the parts embodied in the present illustration are similar to or somewhat like power shovel parts and construction as now employed. In the present instance I have illustrated and designated the supporting structure as 1, this being in substance the machinery carrying and operating floor and supporting structure, and being preferably protected by the usual cab or other construction. The carriage means is generally indicated at 2, and in the present instance I have disclosed this as being of the endless track type, although skids or wheels or other well known carriage means can be provided. The supporting structure 1 is mounted on the carriage means through the medium of a bearing or turntable 3, so that the supporting structure can be turned and can be positioned as may be desired.

A diesel or internal combustion engine, or any other suitable power unit or mechanism can be employed, and such power unit is generally indicated at 4. Control levers can be provided, as at 5, for manipulating and controlling the movement of the carriage and for turning and adjusting the position at which the supporting structure is disposed.

Cable drums 6, which can be of usual construction or of any desired type suitable for the purpose, are mounted and carried on the supporting structure 1, preferably in the middle portion thereof, and at one end the supporting structure carries a supporting bearing 7. An elongated boom 8 has one end thereof swingably mounted in the bearing 7, so that the boom extends substantially outwardly from the supporting structure 1 and is capable of swinging movement in a substantially vertical or perpendicular path. A counterweight 9 is preferably provided at the other end of the supporting structure 1 to somewhat compensate for the weight of the extending boom 8, and in other ways the parts can be substantially usual or standard construction.

A bearing is provided at 10 at the outer or swinging end of the boom 8, and a sheave block 11 having suitable sheaves therein is connected at the bearing and is presented so that cable 12 can be rove therethrough. Increased purchase pulleys 13 can be provided on the upright supporting members or structure 14, and the cables can be run over these sheaves and can be extended to the cable drums in the usual manner. Cable drum control levers or handles 15 are provided for operation and manipulation of the cable drums to wind in and run out the cable as may be desired. With this arrangement of the parts, the boom 8 is swingable in its substantially vertical or perpendicular path and is swung and is controlled by the cable means.

An elongated shovel handle 16 is swingably mounted in its middle portion at the bearing 10 at the outer end of the boom 8, with one end extending downwardly and carrying a shovel bucket 17 and with the other end extending upwardly and swingable around the bearing 10.

An elongated fluid cylinder 18 is swingably connected at one end with a bearing 22 carried on the upper side of the boom 8, at a point spaced inwardly from the bearing 14. A double acting piston 19, movable within the fluid cylinder 18 has a piston rod 20 extending through a suitable packing gland on the opposite end of the fluid cylinder, and this piston rod is pivotally connected at 21 with the upper swinging end of the shovel handle 16.

Suitable pump or other fluid compression means or structure is provided, as at 23, on the supporting structure 1, and has supply and return pipes 24 and 25 leading to a valve casing and valve 26. This valve casing and valve are of any desired and well known construction that will give or permit four-way valve setting, and a valve control handle is provided at 27. A fluid pipe or hose 28 leads from the valve to the outer end of fluid cylinder 18, and a fluid supply and return pipe 29 leads to the inner end of the cylinder 18.

With the arrangement of the parts as set forth, the valve can be manipulated through valve control handle 27 and movement of the shovel can be accomplished.

Thus, with the parts assembled in the manner as described, the cable drum control levers or handles 15 can be actuated to take in or let out the cable 12, and the boom 8 can be thus raised or lowered, as may be desired. By manipulation of the valve control handle 27, fluid can be introduced into either end of the fluid cylinder 18, to move the piston 19 and, through the piston rod, accomplish swinging movement of the shovel handle 16, and consequent swinging movement of the shovel bucket 17. Further, by introducing fluid under pressure in both ends of the fluid cylinder 18, pressure will be exerted against piston 19 to lock the piston in place and to accordingly fix the shovel handle 16 against swinging movement to rigidly retain the shovel bucket 17 in any desired position.

While I have described the shovel bucket as carried at the lower end of the shovel handle, it is an object and purpose of my invention to provide a new and novel and advantageous mounting upon the shovel handle 16 for the shovel bucket 17, and in Figs. 2 through 5 of the drawings I have illustrated one such embodiment. As here illustrated, the shovel handle 16 has a bearing swivel head 30 thereon and the shovel bucket 17 has cooperating swivel bearing parts and locking means to prevent swiveling and hold desired adjustment. The shovel bucket has the usual teeth 31 presented at the open side 32, and since this shovel bucket is of the usual dump type, a door 33 is swingably mounted to cover the dump opening 34. This door 33 can be held in closed position by any suitable or desired latch means 35, and the latch means can be released by the usual trip cable 36. Since these parts are of the usual or standard construction and can be of any desired type, no attempt is being here made to particularly illustrate or describe the same; and, the one essential feature is that the shovel bucket 17 have the upper side thereof closed, as at 37, and that this closed side be of sufficient rigidity and strength to form a mounting for the swivel bearing structure.

As stated, the shovel handle 16 has a bearing swivel head 30 thereon, and a swivel bearing ring 38 has an upstanding sleeve portion loosely and rotatably receiving the shovel handle and is provided with an annular bearing portion 40 rotatably receiving the bearing swivel head 30. The swivel bearing ring 38 is provided with bolt receiving openings registering with screw-threaded openings in the closed upper side 37 of the shovel, and fastening bolts 41 are inserted and screwed through these openings to secure the swivel bearing ring in place. With the parts mounted in this manner, the shovel 17 is substantially swiveled on the lower end of the shovel handle 16, and with the parts properly fitted and lubricated it becomes a very simple matter to move the shovel bucket 17 on this swivel mounting to face the open side 32 outwardly for use as an ordinary scoop shovel, or inwardly to be used after the manner of a drag shovel. Thus, with this swivel mounting the shovel bucket can be readily adjusted to either of two positions of use. To retain the shovel bucket in the desired adjusted position, and to prevent casual or accidental displacement, I have illustrated a locking pin 42 as fitted through registering openings formed transversely through the shovel handle and the upstanding sleeve portion 39. This locking and retaining pin 42 can be held in place and against displacement by a cotter pin or other suitable fastening.

With the embodiment of the swivel mounting for the bucket, as illustrated in Figs. 8 and 9, the shovel handle has a cylindrical portion at 43 adjacent to its lower end, and a widened out swivel head is provided at 44. The swivel bearing 45 has a bearing opening receiving the cylindrical portion 43, and an enlarged annular bearing opening 46 receiving the widened out swivel head 44. The swivel bearing 45 is mounted in place on the upper closed end of the shovel bucket by means of cap screws or bolts 47, and with this construction a very strong and very rigid swivel mounting is provided. To retain the shovel bucket in the desired adjusted position, a locking bolt 48 is provided to be inserted through an opening in the swivel bearing member 45, and turned into a screw-threaded opening 49 in the head of the shovel bucket. The widened out swivel head 44 has two openings 50 and 51 therethrough, and these openings will align with the screw-threaded opening 49 and will receive the locking bolt 48 depending upon the direction in which the bucket is faced to thus hold the shovel bucket in either of its adjusted positions.

It will be appreciated that the construction of the door and the shovel bucket and the trip or latch means therefor, the construction and connection and arrangement of the fluid control valve, the construction and connection of the cable drum control, and the construction and embodiment of the carriage control means, can be varied to suit different types and constructions of machines and different conditions of use; and since such mechanism and parts are well known in this art, no attempt is here being made to particularly show or to describe in detail any of the features or the particular operation.

In the use of my improved structure, the boom 8 and the shovel handle 16 can be independently actuated and moved, somewhat after the manner indicated by the arrows in Fig. 6 of the drawings. Thus, it is possible to actuate these parts separately, or to coordinate actuation of the controls so that the shovel handle and the boom will have cooperating movement, and in this way my improved power shovel can be used in many places and to accomplish operations which are not readily obtainable with machines as heretofore employed. Where it is desired to tear up a slab or roadway, to lift a stump, or to otherwise accomplish a substantially vertical lift, this can be readily accomplished after the manner shown in Figs. 1 and 7 of the drawings, by bringing the teeth of the shovel bucket into the desired lifting position and admitting fluid pressure to both ends of the fluid cylinder to thus substantially lock the shovel handle against swinging movement and ensure that the shovel bucket will be in substantially rigid contact with the object or material to be raised. Then, by manipulation of the parts to swing the boom 8 upwardly, substantially perpendicular or vertical force can be exerted against and upon and substantially under the object or material to be lifted.

Heretofore, where power shovels have had the shovel bucket substantially rigidly fixed at the lower end of the shovel handle, it has been very difficult or next to impossible to reverse the direction in which the bucket faces. Where it has been desired to reverse the bucket, with structures as now in use, it has been ordinarily necessary to disassemble the parts to the extent of taking the shovel handle entirely out of its mounting, to then reverse the parts, and to subsequently reinsert the shovel handle with the shovel bucket facing in the opposite direction. Obviously, to accomplish such an operation is indeed a most difficult and arduous task, and in most instances the operation will require additional derrick or lift mechanism for handling the very heavy handle and shovel bucket assembly.

On the contrary, with my improved structure, the shovel handle always remains in the same mounting, and to accomplish reversal of the shovel bucket it is only necessary to remove the locking pin 42, or the locking bolt 48, as the case may be, to then revolve the shovel bucket upon the swivel mounting through a half turn or substantially 180 degrees, and then again insert the locking pin or locking bolt, when the parts are again ready for immediate use. With this structure, it is not necessary to disassemble any parts or to lift or handle or manipulate any heavy members, and with the swivel mounting the shovel bucket can be reversed frequently and while on the job with a maximum of efficiency and with a minimum loss of time.

While I have herein shown and described only certain specific embodiments of my invention and have suggested only certain modifications and changes, it will be appreciated that many changes and variations can be made in the form, construction, assembly, and the manner of use of the parts, without departing from the spirit and scope of my invention.

I claim:

In a power shovel, a shovel handle having a shank and an enlarged swivel bearing head on the lower end of the shank, a shovel bucket having a swivel bearing ring on the top of the bucket connecting the bucket with the swivel bearing head of said shovel handle for reversible movement for use of the bucket as a scoop or a drag as may be desired, said bearing ring having a recess in which said bearing head is received and rigidly held against rocking movement relative to said bucket with relative movement between said ring and head being restricted to swivel movement about the axis of said shank, said bearing ring having a sleeve portion above said recess and having a bore aligned with said recess and embracing said shank for relative swivel movement, said bore being smaller than said head and opening into said recess to provide a radial shoulder engaging said head, removable means for attaching said ring to said bucket to confine said head in said recess in position to be restrained against rocking movement by said shoulder, said shank and said sleeve having registering openings for each of the working positions of said bucket, and pin means insertable through said registering openings for securing said bucket in the desired position of adjustment.

References Cited in the file of this patent

UNITED STATES PATENTS

| Number | Name | Date |
|---|---|---|
| 670,210 | Shannon | Mar. 19, 1901 |
| 1,020,504 | Hood | Mar. 19, 1912 |
| 1,126,203 | Harris | Jan. 26, 1915 |
| 1,185,427 | Moore | May 30, 1916 |
| 1,479,849 | Williams | Jan. 8, 1924 |
| 2,107,895 | Lundstrom | Feb. 8, 1938 |
| 2,109,388 | Heller | Feb. 22, 1938 |
| 2,443,537 | Hilgeman | June 15, 1948 |
| 2,489,898 | Kluckhohn | Nov. 29, 1949 |

FOREIGN PATENTS

| Number | Country | Date |
|---|---|---|
| 696,060 | France | Oct. 7, 1930 |